United States Patent
Murota

(10) Patent No.: US 9,481,063 B2
(45) Date of Patent: Nov. 1, 2016

(54) TOOL CHANGER PROVIDED WITH COVERS

(71) Applicant: FANUC Corporation, Yamashi (JP)

(72) Inventor: Masahiro Murota, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 77 days.

(21) Appl. No.: 14/515,890

(22) Filed: Oct. 16, 2014

(65) Prior Publication Data

US 2015/0111710 A1 Apr. 23, 2015

(30) Foreign Application Priority Data

Oct. 18, 2013 (JP) ................................ 2013-217756

(51) Int. Cl.
| | |
|---|---|
| *B23Q 3/157* | (2006.01) |
| *B23Q 11/08* | (2006.01) |
| *B23Q 3/155* | (2006.01) |
| *B23Q 16/02* | (2006.01) |

(52) U.S. Cl.
CPC ........... *B23Q 3/157* (2013.01); *B23Q 3/15526* (2013.01); *B23Q 3/15706* (2013.01); *B23Q 11/08* (2013.01); *B23Q 16/02* (2013.01); *Y10T 483/115* (2015.01); *Y10T 483/15* (2015.01); *Y10T 483/1795* (2015.01)

(58) Field of Classification Search
CPC ..................... Y10T 483/115; Y10T 483/1752; Y10T 483/1755; Y10T 483/1757; Y10T 483/176; Y10T 483/179; Y10T 483/1793; Y10T 483/1795; Y10T 483/1798; Y10T 483/1882; Y10S 483/90

USPC ........................ 483/3, 54–57, 38–41, 67, 900
See application file for complete search history.

(56) References Cited

U.S. PATENT DOCUMENTS

| | | | | |
|---|---|---|---|---|
| 4,499,650 | A * | 2/1985 | Cannon | B23Q 3/15526 211/1.53 |
| 5,499,963 | A * | 3/1996 | Fujimoto | B23Q 3/15706 483/54 |
| 9,339,905 | B2 * | 5/2016 | Murota | B23Q 3/15706 |
| 2011/0083307 | A1 * | 4/2011 | Shih | B23Q 3/15706 483/56 |
| 2014/0256527 | A1 * | 9/2014 | Liu | B23Q 3/15706 483/54 |

(Continued)

FOREIGN PATENT DOCUMENTS

| | | |
|---|---|---|
| JP | 4-86137 U | 7/1992 |
| JP | 2006-305663 A | 11/2006 |

(Continued)

OTHER PUBLICATIONS

Machine Translation of Japanese Patent Application No. 2013-215607, filed Oct. 16, 2013.*

(Continued)

*Primary Examiner* — Erica E Cadugan
(74) *Attorney, Agent, or Firm* — Hauptman Ham, LLP

(57) ABSTRACT

In a tool changer configured so that a turret is turned to index a desired tool to be changed, the front and rear surfaces of the turret are covered individually by covers. These covers are each formed in the shape of a truncated cone. Chips and a cutting fluid dropped onto an upper part of the cover that covers the rear surface of the turret flow away from a gap between the covers along a slope of the cover concerned, so that they can be prevented from getting into the turret through the gap.

7 Claims, 2 Drawing Sheets

(56) References Cited

U.S. PATENT DOCUMENTS

| | | | | |
|---|---|---|---|---|
| 2015/0087487 A1* | 3/2015 | Murota | ............. | B23Q 3/15773 483/3 |
| 2015/0105229 A1* | 4/2015 | Li | ........................ | B23Q 3/157 483/13 |
| 2015/0190897 A1* | 7/2015 | Murota | ................. | B23Q 11/08 483/69 |

FOREIGN PATENT DOCUMENTS

| | | |
|---|---|---|
| JP | 2008-229770 A | 10/2008 |
| JP | 2010-99766 A | 5/2010 |
| JP | 2011-173197 A | 9/2011 |

OTHER PUBLICATIONS

Machine Translation of Japanese Patent Application No. 2014-002014, filed Jan. 8, 2014.*

Office Action mailed Dec. 16, 2014, corresponding to Japanese patent application No. 2013-217756.

Office Action mailed Mar. 24, 2015, corresponding to Japanese patent application No. 2013-215607.

* cited by examiner

TOOL CHANGER PROVIDED WITH COVERS

RELATED APPLICATIONS

The present application claims priority to Japanese Application Number 2013-217756, filed Oct. 18, 2013, the disclosure of which is hereby incorporated by reference herein in its entirety.

BACKGROUND OF THE INVENTION

1. Field of the Invention

The present invention relates to a tool changer with covers configured to prevent foreign matter from getting into a turret.

2. Description of the Related Art

A tool changer is conventionally used to automatically change a tool to be mounted on the spindle of a machine tool. This tool changer is previously fitted with a plurality of necessary work tools such that the tool to be mounted on the machine tool spindle can be automatically replaced with a specified one, depending on the machining state.

As is generally known, Japanese Patent Application Laid-Open No. 2010-99766 discloses such an automatic tool changer for automatically changing a tool. This tool changer comprises a turret provided with a plurality of grips for gripping the tool.

The automatic tool changer disclosed in Japanese Patent Application Laid-Open No. 2010-99766, mentioned above, comprises the turret fitted with a plurality of tools such that the turret can be indexed to change the tool mounted on the spindle, whereby the tool can be changed rapidly and accurately. However, the turret is connected to a turret base with a gap defined between its front side and the turret base. Therefore, chips produced during machining and a cutting fluid may possibly get into the turret through the gap.

In some cases, the turret may be provided with cover means that prevents the chips and cutting fluid from getting into the turret during workpiece machining by the machine tool. FIG. 2 shows a prior art automatic tool changer provided with cover means attached to a turret.

An automatic tool changer 2 comprises a turret 6 as a member for changing a tool 4 mounted on the distal end portion of a spindle 3 of a machine tool 1. The spindle 3 of the machine tool 1 moves vertically (in the direction of a Z-axis) as a Z-axis ball screw 10 disposed in a column 12 is rotated by a Z-axis motor 11.

The turret 6 is fitted with a front cover 61 and a rear cover 62 that eliminate adverse affects on structural parts (not shown) therein. The front and rear covers 61 and 62 serve to prevent penetration of the chips and cutting fluid from the front and rear sides, respectively, of the turret 6.

In changing the tool 4, the Z-axis motor 11 is driven to move the spindle 3 vertically. Since the spindle 3 is provided with a cam 7, the turret 6 is swung by a cam follower 8 that follows the cam 7 as the spindle 3 is moved vertically.

Depending on the shape of the rear cover 62, chips and the cutting fluid may easily accumulate on an upper part (corresponding to region A of FIG. 2) of a cylindrical portion 64 of the rear cover 62. As the turret 6 is swung in the aforesaid manner, in this case, chips and the cutting fluid deposited on the upper part (regions A) of the cylindrical portion 64 of the rear cover 62 flow in the direction indicated by arrow B in FIG. 2, and inevitably get into the turret 6 through a gap 65 between the front and rear covers 61 and 62. Consequently, the structural parts in the turret 6 may be adversely affected.

SUMMARY OF THE INVENTION

Accordingly, the object of the present invention is to provide a tool changer comprising covers configured to prevent chips and a cutting fluid from getting into a turret.

A tool changer according to the present invention comprises a turret with a plurality of grips for holding a tool such that the turret is turned to index a desired tool to be changed. The tool changer comprises a front cover which covers a front surface of the turret and a rear cover which covers a rear surface of the turret. A gap is defined between the front cover and the rear cover such that at least an upper part of the rear cover forms a slope declining away from the gap with respect to a horizontal plane.

According to the tool changer of the present invention, chips produced during workpiece machining and a cutting fluid used in the machining drop away from the gap between the front and rear covers along the inclination of the covers, so that they can be prevented from getting into the turret through the gap.

The rear cover may be generally formed in the shape of a truncated cone such that the upper part of the rear cover forms the slope declining away from the gap.

The front cover, like the rear cover, may be generally formed in the shape of a truncated cone.

According to the present invention arranged in this manner, there can be provided a tool changer of a machine tool, comprising covers configured to prevent chips and a cutting fluid from getting into a turret.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

One embodiment of a tool changer according to the present invention, comprising cover means configured to prevent foreign matter from getting into a turret, will be described with reference to FIG. 1.

Figure 1:
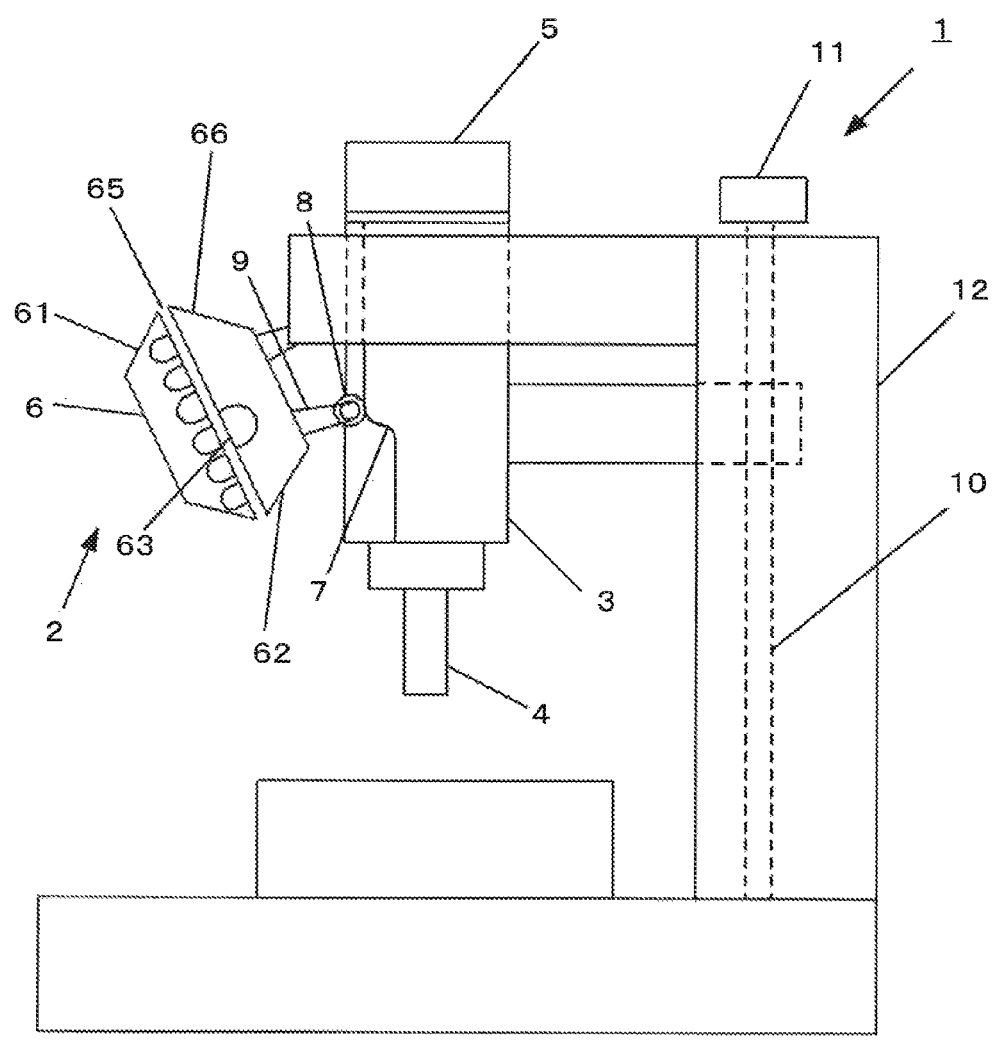
FIG. 1 is a schematic side view showing one embodiment of a tool changer according to the present invention, which comprises cover means configured to prevent penetration of foreign matter into a turret.
Figure 2:
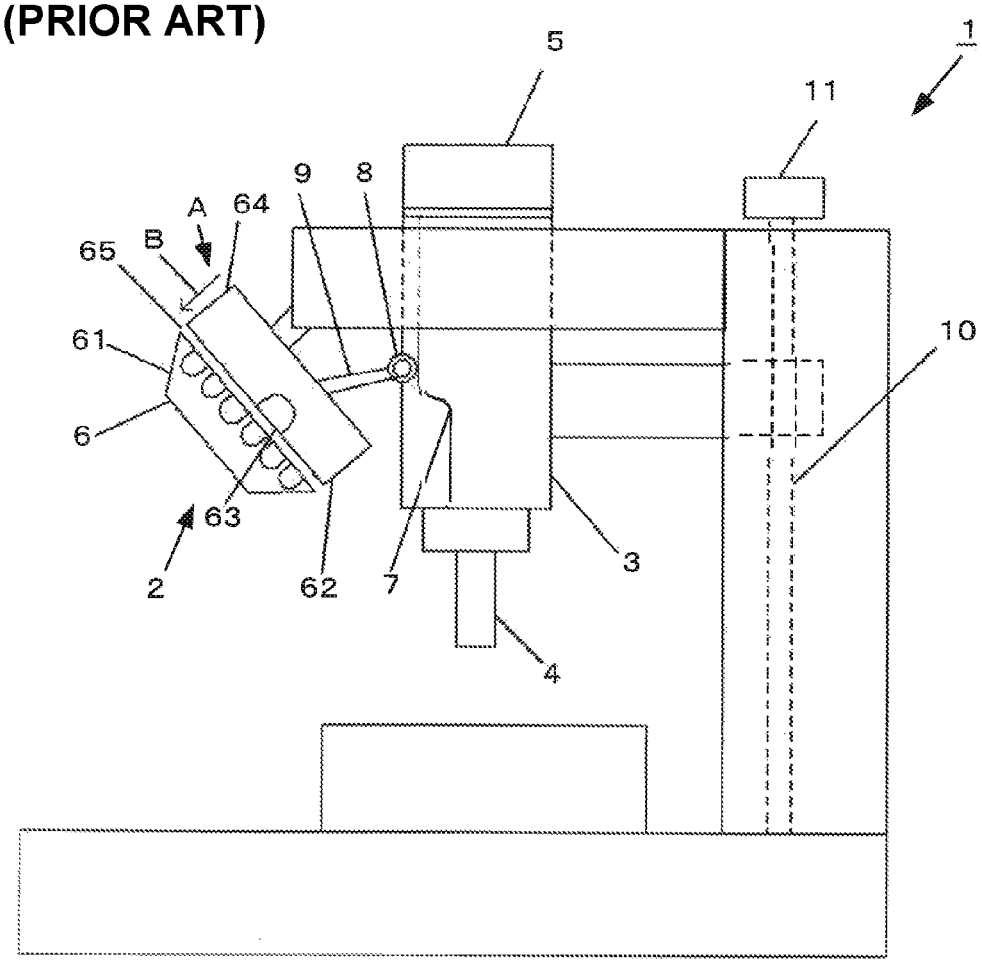
FIG. 2 is a schematic side view showing an example of a prior art tool changer, which comprises cover means configured to prevent penetration of foreign matter into a turret.

The tool changer shown in FIG. 1 differs from the prior art tool changer shown in FIG. 2 in the shape of the rear cover 62 attached to the turret 6. Specifically, at least an upper part of the rear cover 62 forms a slope 66 that declines away from a gap 65 between the rear cover 62 and a front cover 61 with respect to a horizontal plane. The slope 66 may be provided on the remaining surface part as well as on the upper part of the rear cover 62. Since the rear cover 62 shown in FIG. 1 is generally in the shape of a truncated cone, at least its upper part forms the slope 66 that declines away from the gap 65 between the rear and front covers 62 and 61.

Since at least the upper part of the rear cover 62 is in the form of the slope 66 arranged in this manner, chips produced during workpiece machining and a cutting fluid used in the workpiece machining flow down away from the gap 65 between the front and rear covers 61 and 62 along the slope 66. Thus, even if the chips and cutting fluid are dropped onto the upper part (slope 66) of the rear cover 62 of FIG. 1, the direction of inclination of the slope 66 prevents the chips and cutting fluid from moving in the direction indicated by arrow B in FIG. 2. Consequently, the chips and cutting fluid are kept from getting into the gap 65 between the front and rear covers 61 and 62, so that they can be prevented from getting into the turret 6 and adversely affecting structural parts (not shown) therein.

Although the rear cover 62 of FIG. 1 is formed in the shape of a truncated cone, as described above, it may alternatively be in the shape of a truncated pyramid. Although the ridgeline of the slope 66 at the upper part of the is straight, as shown in FIG. 1, it may alternatively be curved only if the slope 66 has a partial inclined portion that declines away from the gap 65.

Further, the front cover 61, like the rear cover 62, may be provided with a slope 66 that declines away from the gap 65 between the rear and front covers 62 and 61, at least at its upper part. The front cover 61 of FIG. 1, like the rear cover 62, is formed in the shape of a truncated cone.

The invention claimed is:

1. A tool changer for a machine tool, the tool changer comprising
a turret having a plurality of grips each configured to hold a respective tool, wherein the turret is configured to swing about a predetermined swing center, and the turret is configured to turn to index a desired tool for changing a tool mounted on a spindle of the machine tool;
a front cover which covers a front surface of the turret that is more distal from the spindle of the machine tool than is a rear surface of the turret; and
a rear cover which covers the rear surface of the turret, which rear surface is closer to the spindle of the machine tool than is the front surface of the turret; wherein
a gap is defined between the front cover and the rear cover; and
each of the front cover and the rear cover forms a slope with respect to a horizontal plane, wherein said slopes start declining immediately from the gap, such that chips produced during workpiece machining and a cutting fluid used in the machining flow down away from the gap along the slopes of the covers, thereby preventing the chips and cutting fluid from getting into the gap.

2. The tool changer according to claim 1, wherein the turret is configured to move between a tool changing position and a tool non-changing position when the spindle of the machine tool moves in a direction of a Z-axis by a motor.

3. The tool changer according to claim 2, wherein when the turret is positioned at the tool non-changing position, the gap exists between the front cover and the rear cover.

4. The tool changer according to claim 2, wherein an upper face of an upper part of each of the covers forms the corresponding slope declining away from the gap when the turret is positioned at the tool non-changing position.

5. The tool changer according to claim 1, wherein the rear cover has a shape of a truncated cone.

6. The tool changer according to claim 1, wherein the rear cover has a shape including a straight ridgeline.

7. The tool changer according to claim 1, wherein the rear cover is curved.

* * * * *